(12) United States Patent
Gaal et al.

(10) Patent No.: US 8,526,524 B2
(45) Date of Patent: Sep. 3, 2013

(54) ORTHOGONAL REFERENCE SIGNAL PERMUTATION

(75) Inventors: Peter Gaal, San Diego, CA (US);
Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1020 days.

(21) Appl. No.: 12/055,827

(22) Filed: Mar. 26, 2008

(65) Prior Publication Data

US 2008/0240281 A1  Oct. 2, 2008

Related U.S. Application Data

(60) Provisional application No. 60/908,400, filed on Mar. 27, 2007.

(51) Int. Cl.
*H04B 7/02* (2006.01)

(52) U.S. Cl.
USPC ........... 375/267; 375/259; 375/260; 375/261; 375/316

(58) Field of Classification Search
USPC .......................... 375/267, 259, 260, 316, 261
See application file for complete search history.

(56) References Cited

U.S. PATENT DOCUMENTS

| 4,460,992 | A | * | 7/1984 | Gutleber | 370/441 |
|---|---|---|---|---|---|
| 5,084,900 | A | * | 1/1992 | Taylor | 370/320 |
| 5,596,582 | A | * | 1/1997 | Sato et al. | 370/509 |
| 6,091,761 | A | * | 7/2000 | Popovic | 375/150 |
| 7,149,239 | B2 | * | 12/2006 | Hudson | 375/144 |
| 7,586,976 | B1 | * | 9/2009 | Duggan | 375/144 |
| 7,809,097 | B2 | * | 10/2010 | Wang et al. | 375/355 |
| 2003/0043887 | A1 | * | 3/2003 | Hudson | 375/144 |
| 2003/0087603 | A1 | * | 5/2003 | Li et al. | 455/63 |
| 2004/0120274 | A1 | * | 6/2004 | Petre et al. | 370/320 |
| 2004/0132443 | A1 | * | 7/2004 | Klein et al. | 455/424 |
| 2004/0266354 | A1 | * | 12/2004 | Hamada et al. | 455/63.4 |
| 2006/0215735 | A1 | * | 9/2006 | Dalmases et al. | 375/146 |
| 2006/0221810 | A1 | * | 10/2006 | Vrcelj et al. | 370/208 |
| 2007/0071127 | A1 | | 3/2007 | Gore et al. | |
| 2007/0133462 | A1 | * | 6/2007 | Guey | 370/330 |
| 2008/0170608 | A1 | * | 7/2008 | Guey | 375/220 |

FOREIGN PATENT DOCUMENTS

| DE | 4212300 | 10/1993 |
|---|---|---|
| EP | 1601118 | 11/2005 |
| EP | 1677439 | 7/2006 |

OTHER PUBLICATIONS

International Search Report and Written Opinion—PCT/US2008/058507, International Search Authority—European Patent Office—Mar. 13, 2009.
Taiwan Search Report—TW097111096—TIPO—Jun. 14, 2012.

* cited by examiner

*Primary Examiner* — Kenneth Lam

(57) ABSTRACT

A method for a wireless communication system is provided. The method includes analyzing a set of signal sources that are operably associated with a set of time domain windows. Often, the method periodically switches the association between the set of time domain windows and the set of signal sources in order to facilitate a determination of one or more signal paths generated by the signal sources.

26 Claims, 11 Drawing Sheets

| | Antenna 1 | Antenna 2 | Antenna 3 | Antenna 4 |
|---|---|---|---|---|
| Sector A | $S_0$ | $S_0$ | $S_0$ | $S_0$ |
| Sector B | $S_1$ | $S_2$ | $S_1$ | $S_2$ |
| Sector C | $S_2$ | $S_1$ | $S_2$ | $S_1$ |

FIG. 4

ORTHOGONAL REFERENCE SIGNAL PERMUTATION

CROSS REFERENCE TO RELATED APPLICATION

This application claims the benefit of U.S. Provisional Patent Application No. 60/908,400, entitled A METHOD AND APPARATUS FOR ORTHOGONAL REFERENCE SIGNAL PERMUTATION, and filed on Mar. 27, 2007, the entirety of which is incorporated herein by reference.

BACKGROUND

I. Field

The following description relates generally to communications systems, and more particularly to performing accurate signal path determinations for mobile wireless communications systems.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Generally, each of the NS independent channels corresponds to a dimension. The MIMO system can provide improved performance (e.g., higher throughput and/or greater reliability) if the additional dimensionalities created by the multiple transmit and receive antennas are utilized.

A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

Wireless systems transmit pilot signals or reference signals from base stations to receivers in order to facilitate communications. These and other signals are analyzed by receivers during specific time windows. For instance, a signal for a first base station may be analyzed during a first time period, a second base station during a second time period and so forth. As is the case with almost all mobile wireless devices however, in order to conserve power, the devices are often put into sleep mode, where only basic communications are maintained with the base stations. Every one hundred milliseconds or so, the devices will wake out of sleep mode and perform calculations such as a channel estimation. Due to the nature of how signals are analyzed according to various time windows, and given that the devices may only observe what has happened intermittently in order to conserve power, errors may be encountered when trying to analyze which signals have been received from the respective base stations. In other words, it is possible that one or more signals for a first base station could be captured and observed in a time window designated for another base station. This may cause inaccurate determinations at the receivers.

In general, there are several potential causes for signals to drift outside a given observation window. In one case, the velocity at which a mobile device is traveling can contribute to the problem. This is not a significant problem since mobile velocities are much slower that signal velocities that are at the speed of light. Another problem can include signals that have fairly long multi-path components that cause portions of the signal to appear improperly in a neighboring observation window. Perhaps the most insidious problem is drift caused by clock error rates in the receiver. If base station signals were continually being monitored, it would be possible to track and account for any resultant drifts. Unfortunately, since the receivers are in sleep mode for much of the time, it is not possible to track how signal paths have changed over time.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods are provided to mitigate the effects of signal source drifts that may be encountered in mobile wireless applications. Received wireless signals are analyzed according to time observation windows, where such windows can be periodically disassociated from their respective signal source generators in order to determine which signal source components are within a given window. In one example, signal source 1, 2, and 3 are analyzed according to time observation windows A, B, and C. If these signals were merely analyzed during a wake period for a receiver and according to a repeating, static, and predetermined sequence, it is possible that some of the signals for source 1 appear in neighboring Window B and some of the signals for source 2 appear in neighboring Window C and so forth. By periodically changing the relationship between the signal source and the observation windows at the base station, it is possible to then determine which received signals belong to the appropriate observation window at the receiver. In other words, an orthogonal spreading assignment for received signals is periodically changed at a respective base station to facilitate the appropriate time observation and account for the resultant drifts involved at the receiver. Thus, in prior systems, each signal was assigned a static orthogonal spreading code which could then lead to inaccurate signal determinations due to drift. According to the claimed innovation, spreading code assignments or observation windows are periodically changed which in turn allows a receiver that operates in an intermittent manner to then determine which signal source belongs to the associated observation window.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

FIG. 4 illustrates an alternative switching methodology for wireless communications systems.

DETAILED DESCRIPTION

Figure 1:
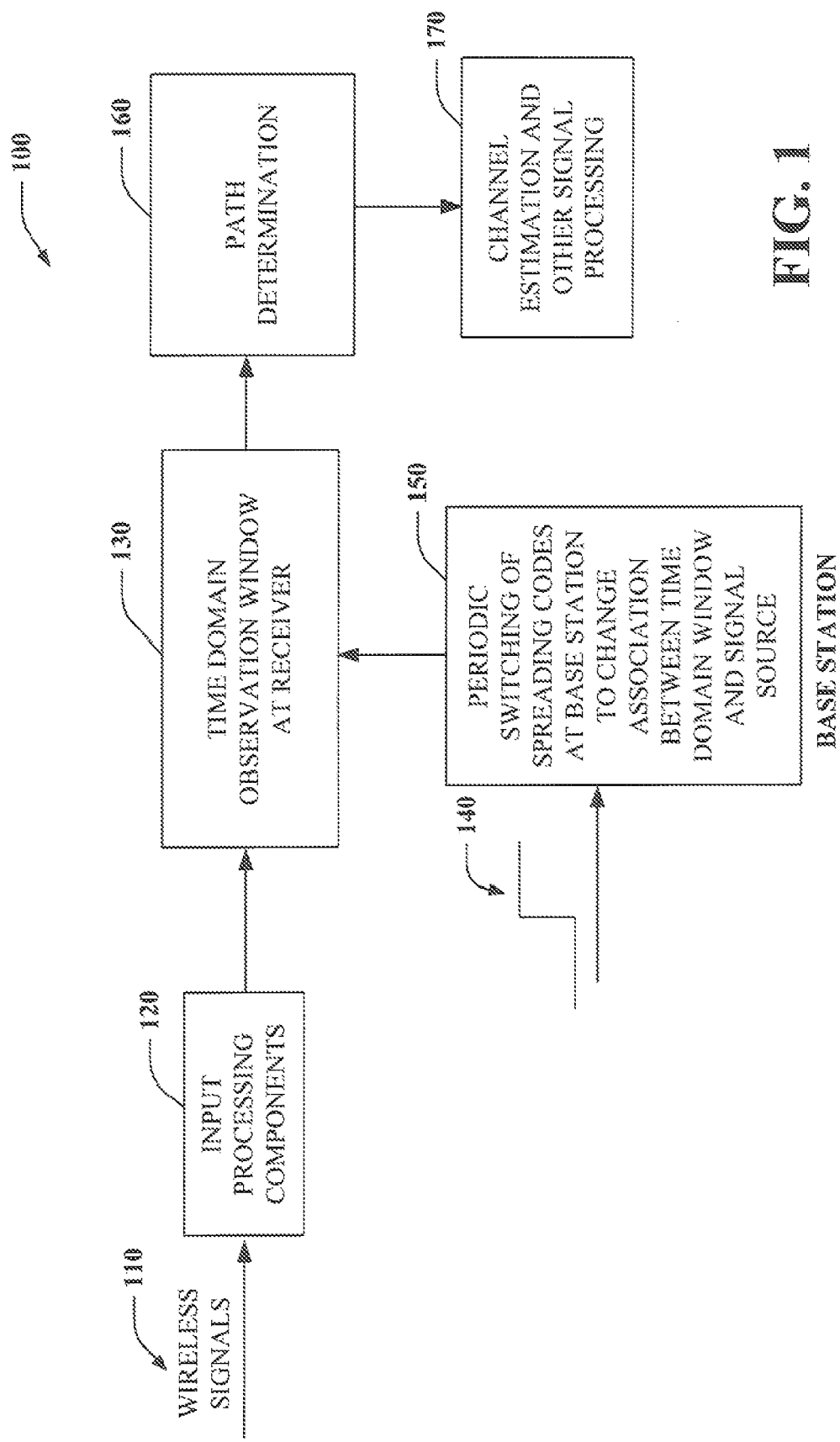
FIG. 1 is a high level block diagram of a system that is provided to illustrate orthogonal reference signal permutation in a communications environment.

Systems and methods are provided for accurate determination of drifting signal paths in order to facilitate channel estimation and other wireless receiver processing. In an aspect, a method for a wireless communication system is provided. The method includes analyzing a set of signal sources that are operably associated with a set of time domain windows. Then, periodically switching the association between the set of time domain windows and the set of signal sources in order to facilitate a determination of one or more signal paths generated by the signal sources.

In general, systems and methods are provided to periodically change the orthogonal sequence assignment so that the ordering of sectors within the time domain observation window is reversed. Without losing generality, one can assume that a given target sector is shifted (cyclically) to the same segment within the time window. With this arrangement, paths that are observed at a constant position belong to the target sector, while paths that alternate their position belong to other sectors. By designating a different target sector, the same method can identify the paths belonging to any of the sectors. An alternative method useable in the case of multiple transmit antennas is to cause the sequence assignment to be constant in time but permuted across transmittal antennas.

Furthermore, various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Referring now to FIG. 1, a system 100 illustrates orthogonal reference signal permutation for a communications environment. The system 100 provides effective channel estimation and other signal processing for a multiple-in-signal-out or a multiple-in-multiple-out (MIMO) system (or other type systems described below). Various processing components removes, mitigates, or decreases signal drifts at a receiver. Wireless signals 110 (including symbols and other structures) are initially processed by input processing components 120 and are subsequently processed by a time domain observation window 130. A switching component 140 causes a periodic change of spreading codes at a base station (or stations) 150. It is noted that the term spreading codes to refer to the modulating sequences used to orthogonalize, decorrelate or otherwise differentiate pilot signals or reference signals transmitted by different signal sources. Different signal sources may be different base stations, different sectors of the same base station, different transmit antennas in the same sector, different mobile stations, or different antennas of the same mobile station. Also, it is noted that the term spreading codes are used irrespective of whether the codes are used for signal bandwidth expansion or not.

Figure 3:
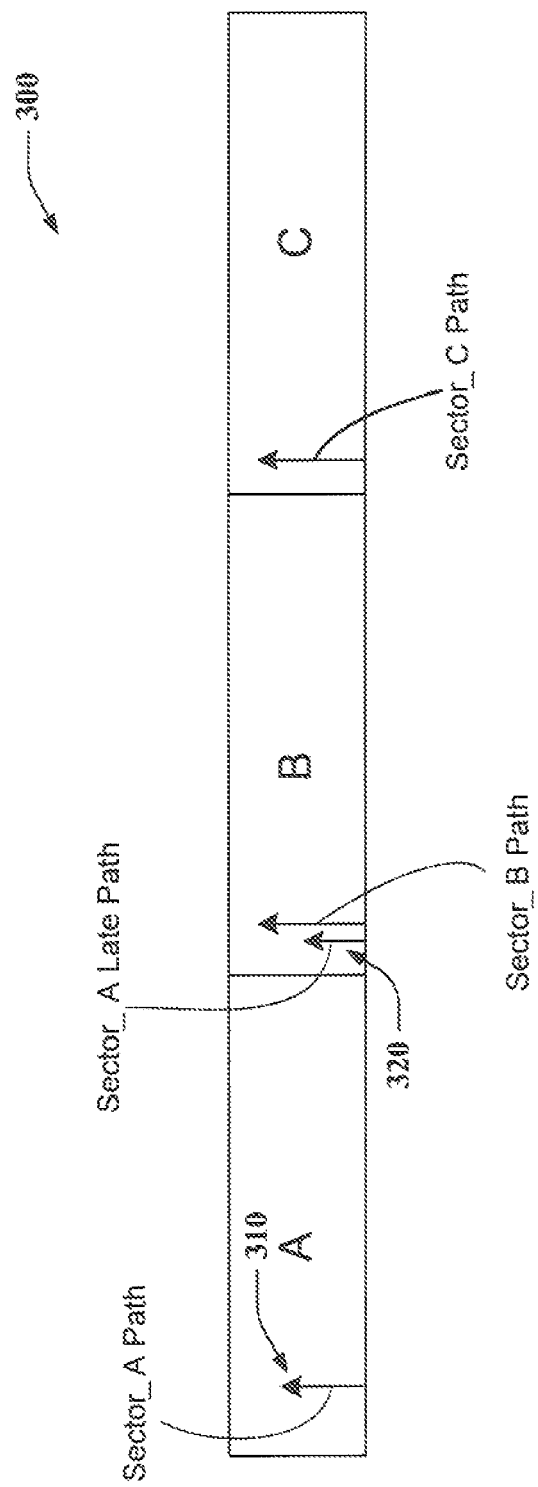
FIG. 3 is an example diagram of signal paths and time windows associated with three base stations or sectors.

By periodically changing the codes, it is possible to determine the correct time alignments for signals that originate at the base station 150. As shown, a path determination is performed at 160 after the respective switching 140 that enables further channel estimation and other signal processing at 170. Referring briefly to FIG. 3, a signal diagram 300 shows three observation windows A, B, and C. Sector path A 310 is received in window A on one observation, yet in anther observation, a late path for signal A appears in window B at 320. By periodically disassociating the time window 130 and the signal path from the base station 150 via the spreading codes which are described in more detail below, it is possible to determine that the late path 320 correctly belongs to window A and not incorrectly with window B.

Referring back to FIG. 1, the system 100 mitigates the effects of signal source drifts that may be encountered in mobile wireless applications. Received wireless signals 110 are analyzed according to time observation windows 130, where such windows can be periodically disassociated from their respective signal source generators in order to determine which signal source components are within a given window. In one example, signal source 1, 2, and 3 are analyzed according to time observation windows A, B, and C. If these signals were merely analyzed during a wake period for a receiver and according to a repeating, static, and pre-determined sequence, it is possible that some of the signals for source 1 appear in neighboring window B and some of the signals for source 2 appear in neighboring window C and so forth as shown in FIG. 3.

By periodically changing the relationship between the signal source and the observation windows at the base station 150, it is possible to then determine which received signals belong to the appropriate observation window at the receiver. In other words, an orthogonal spreading assignment for received signals is periodically changed at a respective base station 150 to facilitate the appropriate time observation and account for the resultant drifts involved at the receiver. Thus, in prior systems, each signal was assigned a static orthogonal spreading code which could then lead to inaccurate signal determinations due to drift. According to the claimed innovation, spreading code assignments or observation windows are periodically changed which in turn allows a receiver that operates in an intermittent manner (e.g., power up and down to conserve power) to then determine which signal source belongs to the associated observation window.

In a more detailed aspect, assume the system 100 processes the available time domain spectrum to yield time domain estimates $\hat{c}_1, \hat{c}_2, \hat{c}_3$) for three pilots as follows:

$$\hat{c}_{1,i} = \begin{cases} c_i & 0 \leq i \leq L/3 \\ 0 & \text{otherwise} \end{cases}$$

$$\hat{c}_{2,i} = \begin{cases} c_{i+L/3k} & 0 \leq i \leq L/3 \\ 0 & \text{otherwise} \end{cases}$$

$$\hat{c}_{3,i} = \begin{cases} c_{i+2L/3k} & 0 \leq i \leq L/3 \\ 0 & \text{otherwise} \end{cases}$$

where L is the number of pilot tone observations. This observation works well if the delay spread is known to be less than ⅓ of the delay spread corresponding to the original pilot spacing however. The pilot signals may also be referred to by other names, for example, in long term evolution (LTE) systems the pilot signals are called reference signals (RS).

While the resulting channel estimation time window is sufficient when compared to the cyclic prefix (CP) length, there is still a potential for problems with path identification. This can create difficulty with the receive time adjustment, for example. Some path ambiguity cases are shown in FIG. 3 below. Three sectors A, B and C were assumed. Ambiguity may also arise due to:

Early or late path position
  Mirror image of path $\tau_1$ at $\tau_1+L/2$ due to Doppler decorrelation. Doppler decorrelation may occur at very high user velocities in systems where the pilot signal is transmitted at different frequency tone locations in different time symbols with the intent that after combining the pilot tones from multiple symbols, the frequency domain channel sampling rate will be increased. Such a pilot signal structure is referred to as staggered pilots. As an example, consider the LTE reference signal structure where reference signals are transmitted in every sixth frequency tones and in alternating time symbols the tone locations are shifted by three frequency tones. Therefore in a single time symbol, the channel sampling rate is ⅙ but by combining two consecutive time symbols containing reference signals, the channel sampling rate can be increased to ⅓. An increase in frequency domain sampling rate improves the channel estimation in highly frequency selective channels. In very high Doppler cases; however, the signal propagation channel may change between the two consecutive time symbols containing reference signals to be combined, which results in Doppler decorrelation errors. Note that the ambiguity will not be resolved by longer observations because the path positions will not change from subframe to subframe.

In the following, some of the possible methods are discussed to resolve the path ambiguity. If the secondary synchronization code (SSC) sequences assigned to sectors A, B and C are not cyclic shifts of each other, then the same ambiguity wouldn't occur in the SSC observation. Unfortunately, the SSC bandwidth is low, so it may be difficult to distinguish real paths from side-lobes. Nevertheless, at least in many cases, interference from a certain collocated sector could be ruled out because of the low observed SSC power. This leads to the possibility of extending the time domain channel estimation window for a sector of interest at the expense of the sector that was ruled out by the SSC observation.

As was described above, the current observation structure is static in the sense that the relative path locations are not changing over a longer observation period. This can be changed if the orthogonal sequence allocation is permuted across sub-frames. Thus, there are 3! sequence allocation permutations, however, there are only two possible time window arrangements under the equivalence of cyclic shifts: permutations are time shifts of either {A, B, C} or {A, C, B}. However, having only two possible time window arrangements is already sufficient to remove most ambiguity. The system 100 can also rely on the fact that most often only one or two collocated sectors can be observed with significant power out of the three.

An example permutation sequence is simply interchanging the orthogonal sequence matrices $S_1$ and $S_2$ at every k·0.5 ms boundary, where k is an appropriately selected integer. One possible drawback of this approach is that combining the staggered pilot symbols, as explained before in the context of Doppler decorrelation, across the change boundary can result in uneven frequency domain channel sampling rates and thereby it can reduce the orthogonal sequence suppression for that combined symbol, so it may not be appropriate for channel estimation. An alternative spreading approach is described below with respect to FIG. 4.

It is noted that the system 100 can be employed with an access terminal or mobile device, and can be, for instance, a module such as an SD card, a network card, a wireless network card, a computer (including laptops, desktops, personal digital assistants PDAs), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
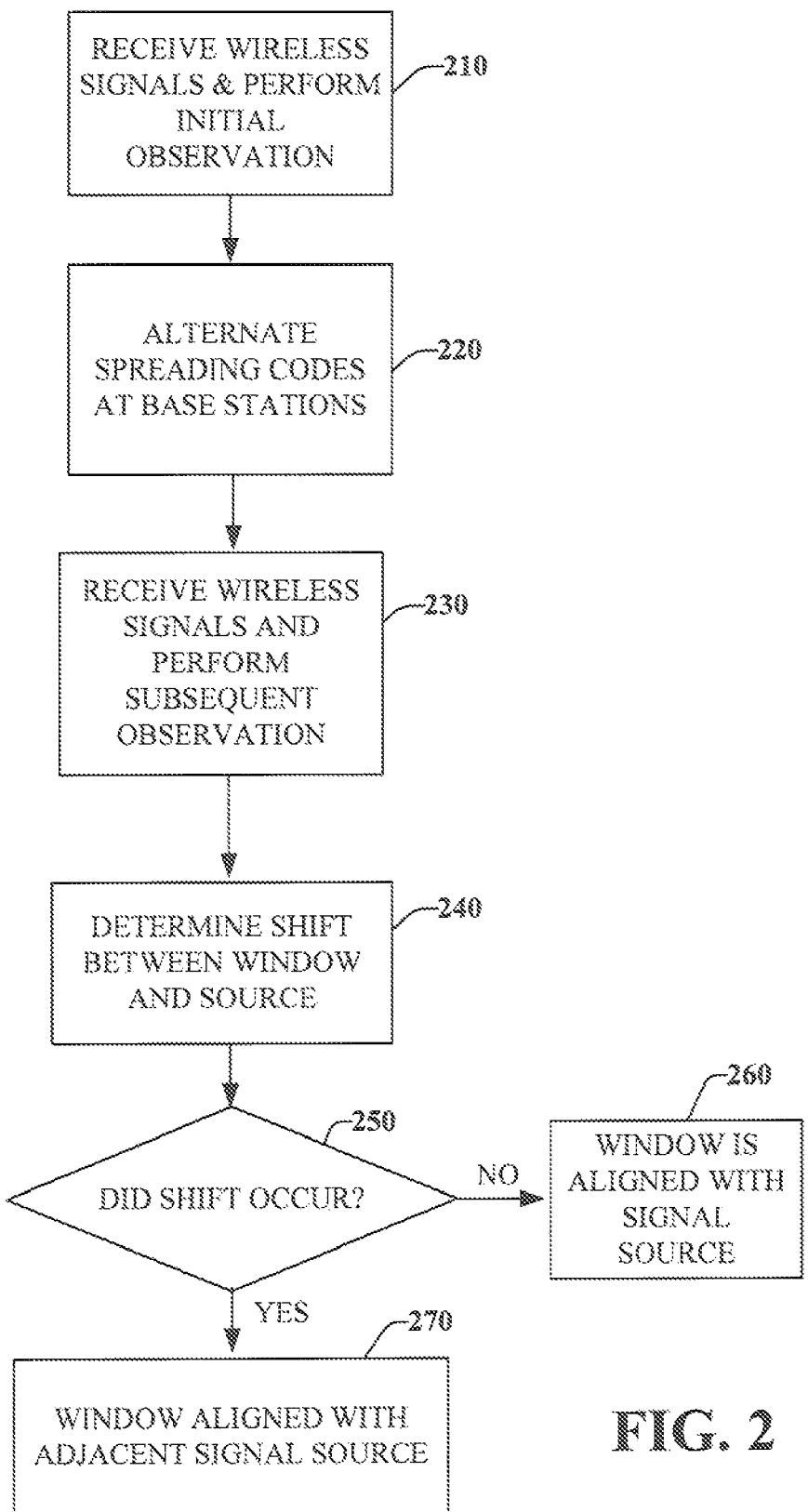
FIG. 2 is a high level flow diagram of a wireless communications methodology.

Referring now to FIG. 2, a wireless communications methodology 200 is illustrated. While, for purposes of simplicity of explanation, the methodology (and other methodologies described herein) is shown and described as a series of acts, it is to be understood and appreciated that the methodology is not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to 210 of process 200, wireless signals are received and initial time domain observations are performed in view of the respective signals. The signals can be from multiple base stations or multiple sectors of the same base stations. At 220, alternative spreading code sequences are transmitted from the respective base stations or sectors. This will enable later determinations of whether or not a signal path has drifted from one observation window to another. At 230, received wireless signals are subsequently analyzed at a receiver after the spreading codes have been switched at 220. At 240, a determination is made as to whether or not any observed shifts have occurred between initial observations at 210 according to one permutation sequence, and subsequent observations at 240 according to alternative permutation sequences.

At 250, a logical determination is made as to whether a shift has in fact occurred between the observations. For instance, if initially a signal path 1 was observed during window A and subsequently, after spreading codes have changed, signal path 1 is now observed during window B, then a shift has occurred. If signal path 1 remains with window A, then no shift has occurred. If a shift has not occurred at 250, the process determines that the time domain window is aligned with the respective signal source at 260. If a shift has been detected at 250, then the process determines that the window is aligned with the adjacent windows and processing is then adjusted accordingly at 270 to account for the shift (e.g., signals appearing in window B are actually assigned for processing from window A).

Referring to FIG. 4, a table 400 illustrates an alternative sequencing and permutation scheme. The sequence permutation method described before may require an applicable Standards change where ordering at base stations and sectors are changed periodically. A smaller change or no change is required if one desires to allow different assignment across different transmit antennas. An example is given in the table 400. $S_0$, $S_1$ and $S_2$ in table 400 denote three different pilot spreading codes.

Generally, as long as the path locations are closely correlated across the antennas, which should hold when the transmit antenna separation is less than the equivalent chip distance (15 m for 20 MHz BW) and much less than the user equipment to enhanced node B distance (UE-eNB), then this aspect is equivalent to the sequence permutation described above. With this method, there is no restriction on the combinable staggered symbols. One drawback of the antenna specific assignment method is that it cannot work without multiple antenna transmissions.

In general, methods to reduce multi-sector path ambiguity were described herein. For the multiple transmit antenna cases, the antenna specific assignment would seem to solve most path ambiguity cases. For the single or multiple transmitted antenna cases, the sequence permutation method could be used to achieve similar results.

Figure 5:
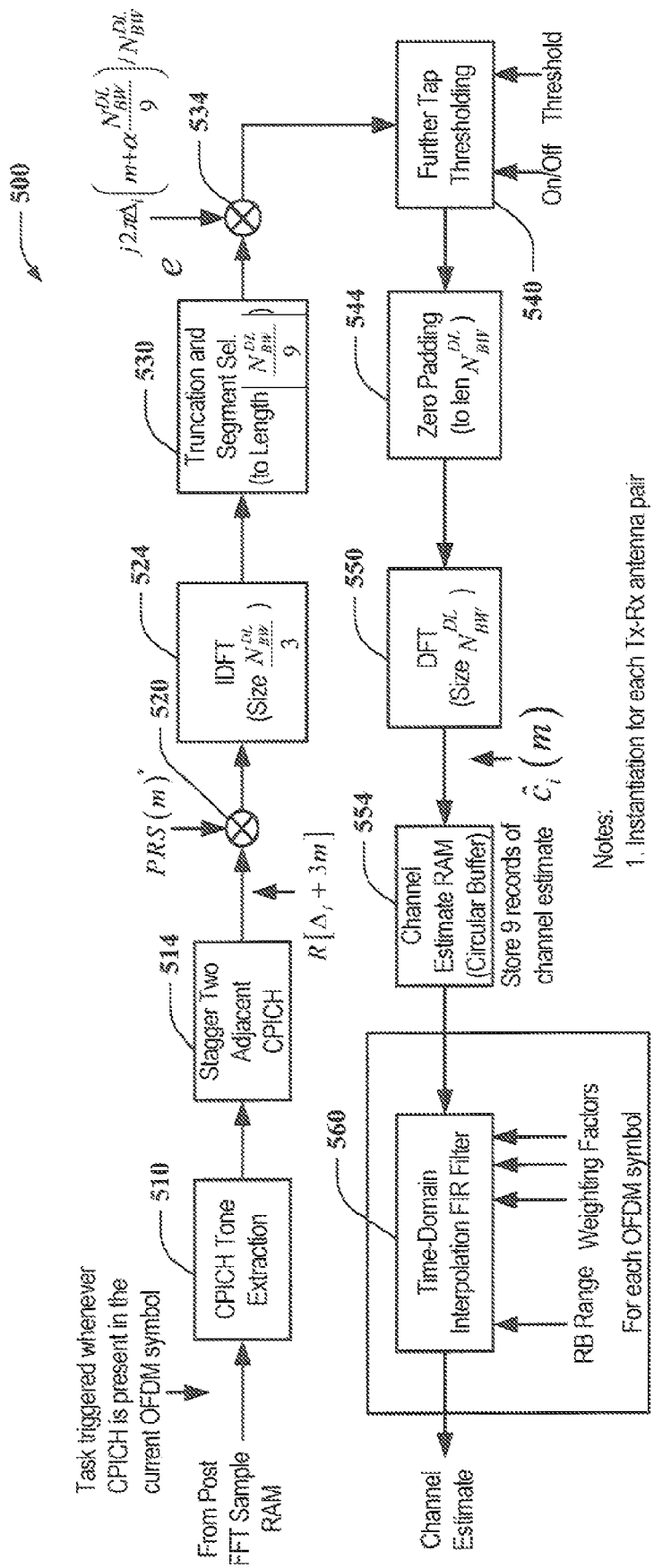
FIGS. 5-6 illustrate exemplary circuit diagrams to perform wireless signal processing.
Figure 6:
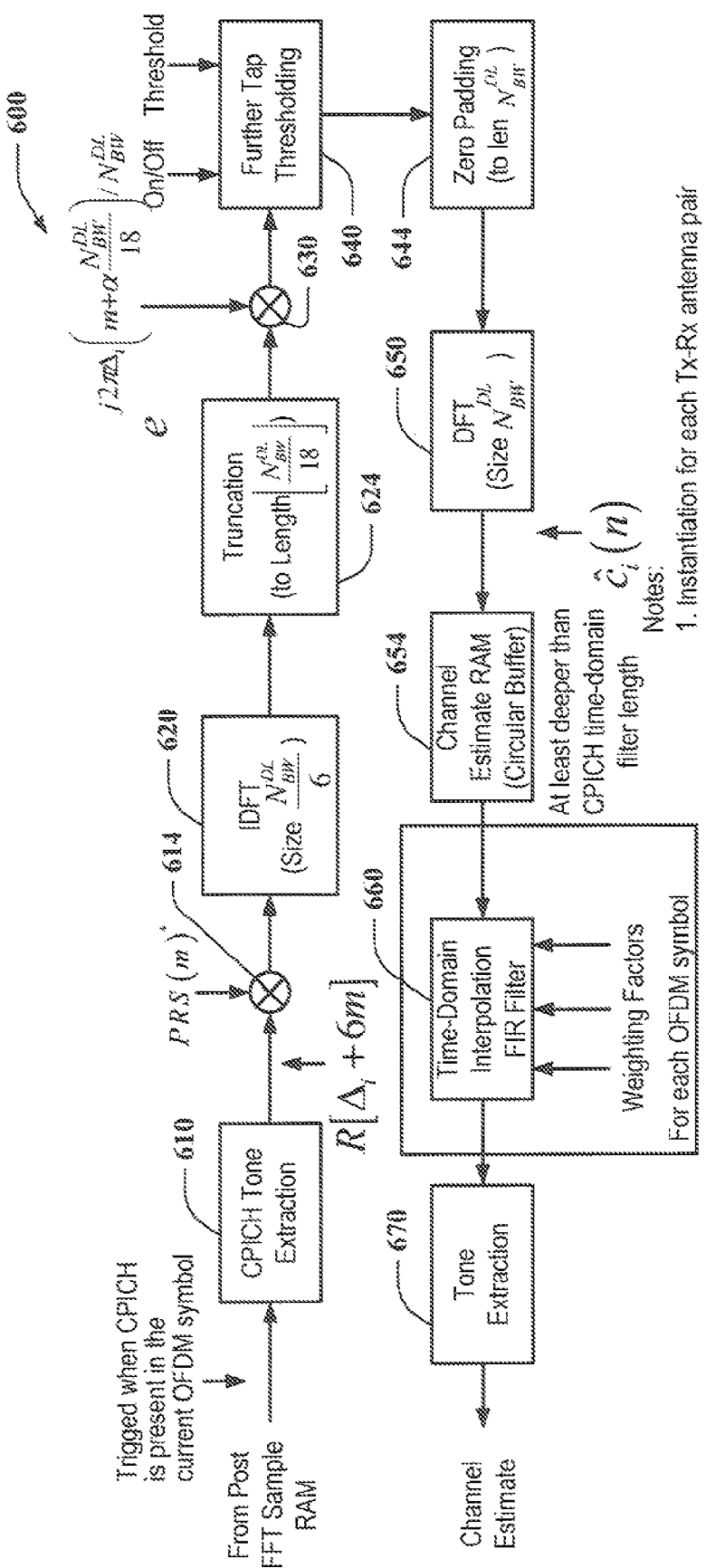

FIGS. 5-6 illustrate example circuits to perform signal processing in accordance with the concepts described herein. It is to be appreciated that such circuits are not the only manner in which to perform such processing. Generally any components that perform orthogonal permutations across time domain windows and associated processing is within the scope of the embodiments described herein.

Referring to FIG. 5, an example circuit 500 is illustrated to perform channel estimation or other signal processing. A received sample is processed via a tone extractor 510 that feeds output to a stagger component 514. Output from the stagger circuit 514 is combined with other signals at 520, where an IDFT is performed at 524. Output from the TDFT 524 is truncated at 530 and combined with other phase information at 534. Output from 534 is fed to a thresholding tap 540 which drives a zero padding component 544. Output from the zero padding component 544 is fed to a DFT 550 which subsequently drives a channel estimate buffer 554 and a time domain interpolation filter 560 which generates a channel estimation.

Referring now to FIG. 6, an example circuit 600 is illustrated to perform channel estimation or other signal processing. Inputs samples are processed by a tone extractor 610 that combines output with other signals at 614 which is than fed to an IDFT 620. Output from the IDFT 620 is truncated at 624 and combined with other phase information at 630. Output from 630 is fed to a thresholding tap at 640 which is fed to a zero padding component 644. Output from 644 is transformed via a DFF at 650 and fed to a channel estimate buffer which is processed by a time domain interpolation filter 660. Output from the filter 660 is fed to a tone extractor 670 where a channel estimation is then generated.

Figure 7:
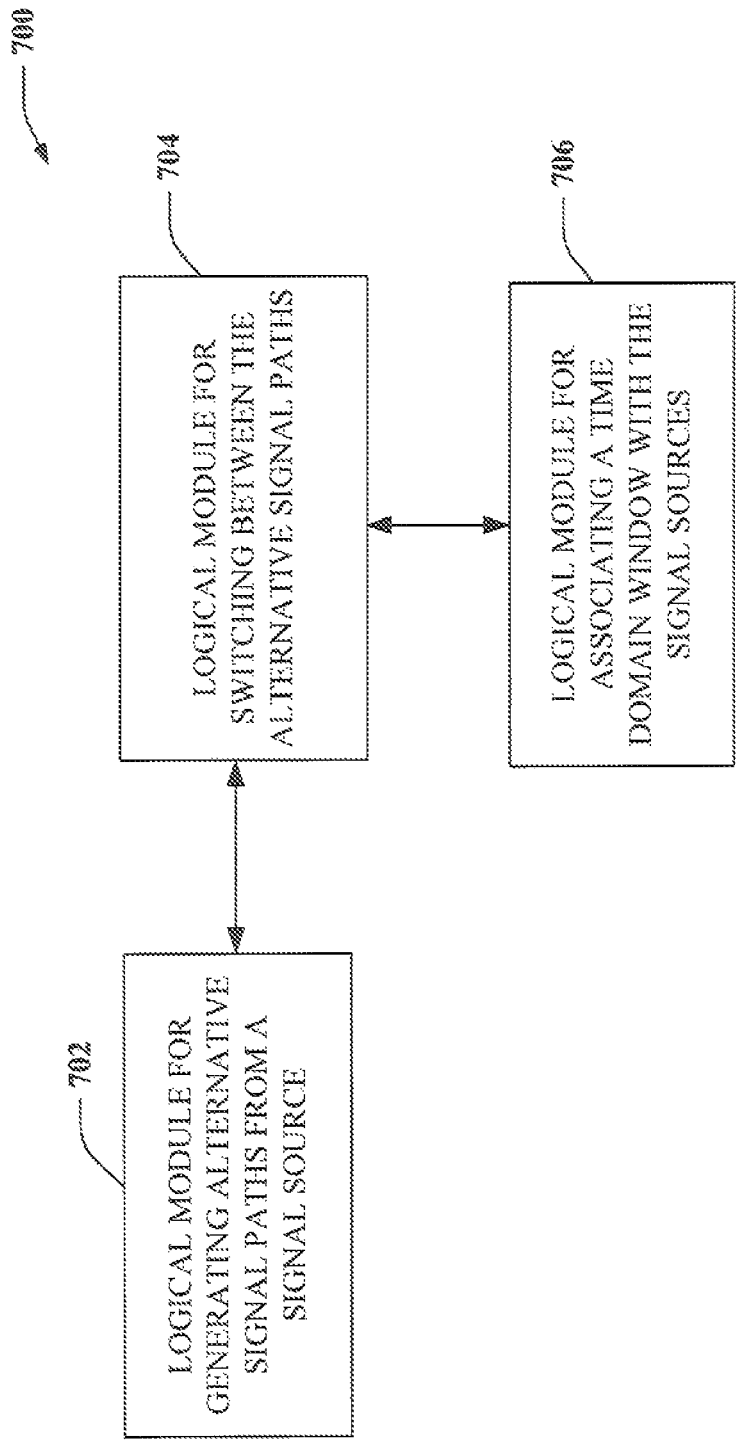
FIG. 7 illustrates an example logical module for pilot signal generation.
Figure 8:
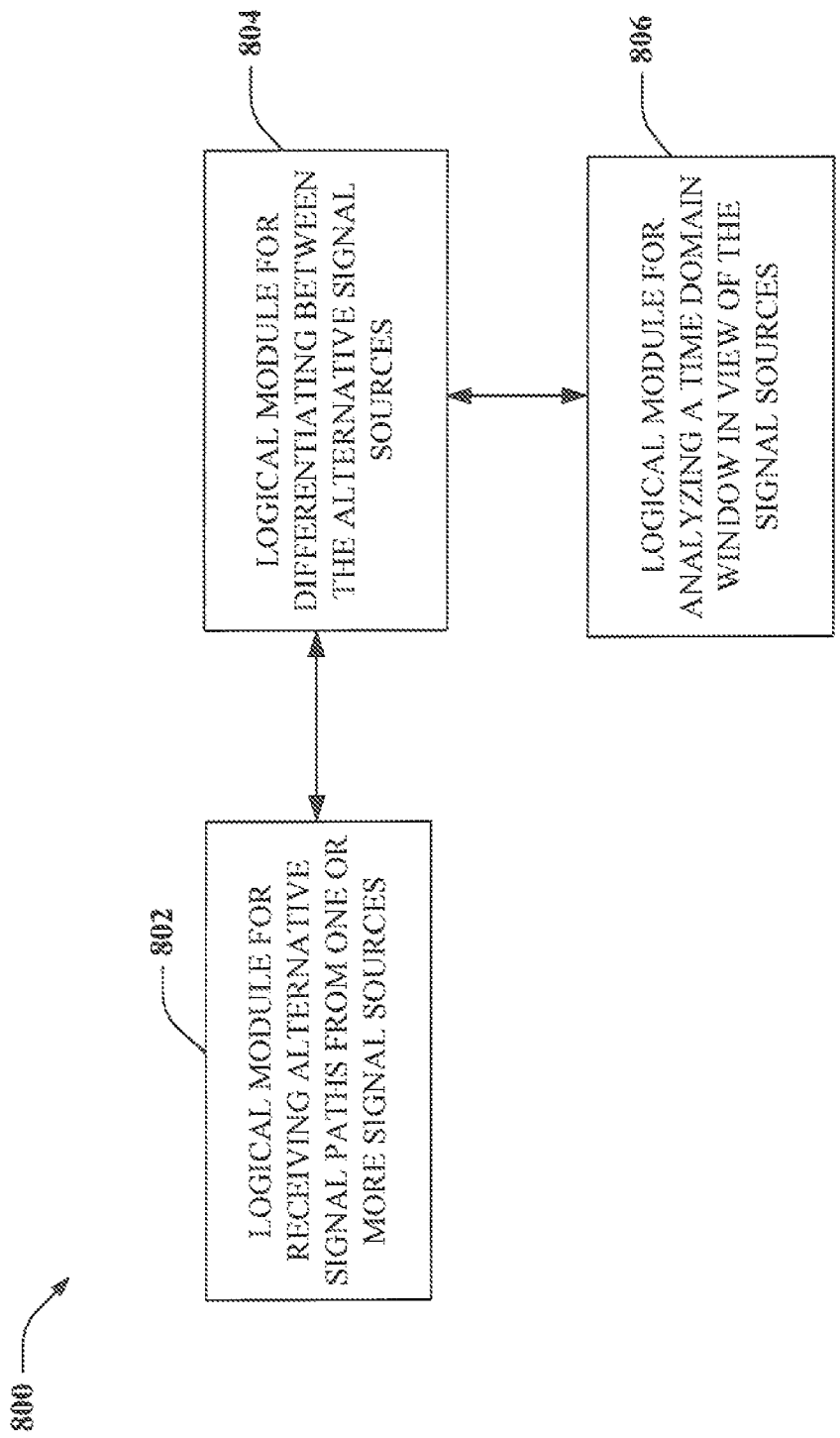
FIG. 8 illustrates an example logical module for wireless processing.

Turning now to FIGS. 7 and 8, a system is provided that relates to wireless signal processing. The systems are represented as a series of interrelated functional blocks, which can represent functions implemented by a processor, software, hardware, firmware, or any suitable combination thereof.

A system 700 is provided that facilitates wireless communications. The system 700 includes a logical module 702 for generating alternative signal paths from a signal source and a logical module 704 for switching between the alternative signal paths. The system 700 also includes a logical module 706 for associating a time domain window with the signal sources.

A system 800 is provided that facilitates wireless communications. The system 800 includes a logical module 802 for receiving alternative signal paths from one or more signal sources and a logical module 804 for differentiating between the alternative signal sources. The system 800 also includes a logical module 806 for analyzing a time domain window in view of the signal sources.

Figure 9:
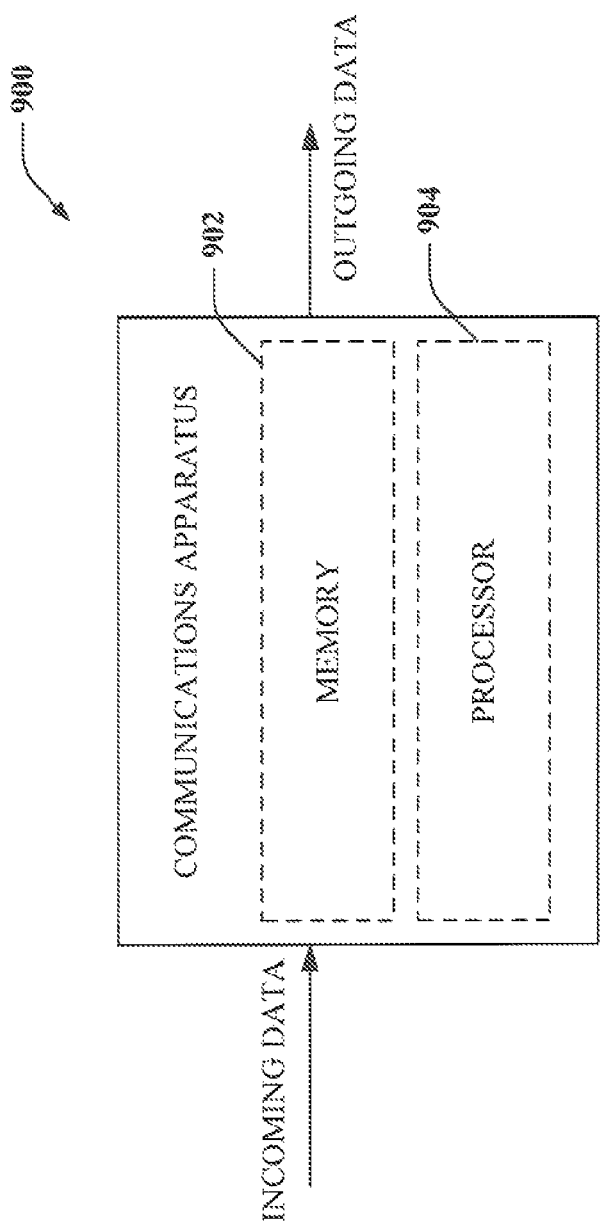
FIG. 9 illustrates an example communications apparatus that employs channel estimation.

FIG. 9 illustrates a communications apparatus 900 that can be a wireless communications apparatus, for instance, such as a wireless terminal. Additionally or alternatively, communications apparatus 900 can be resident within a wired network. Communications apparatus 900 can include memory 902 that can retain instructions for performing a signal analysis in a wireless communications terminal. Additionally, communications apparatus 900 may include a processor 904 that can execute instructions within memory 902 and/or instructions received from another network device, wherein the instructions can relate to configuring or operating the communications apparatus 900 or a related communications apparatus.

Figure 10:
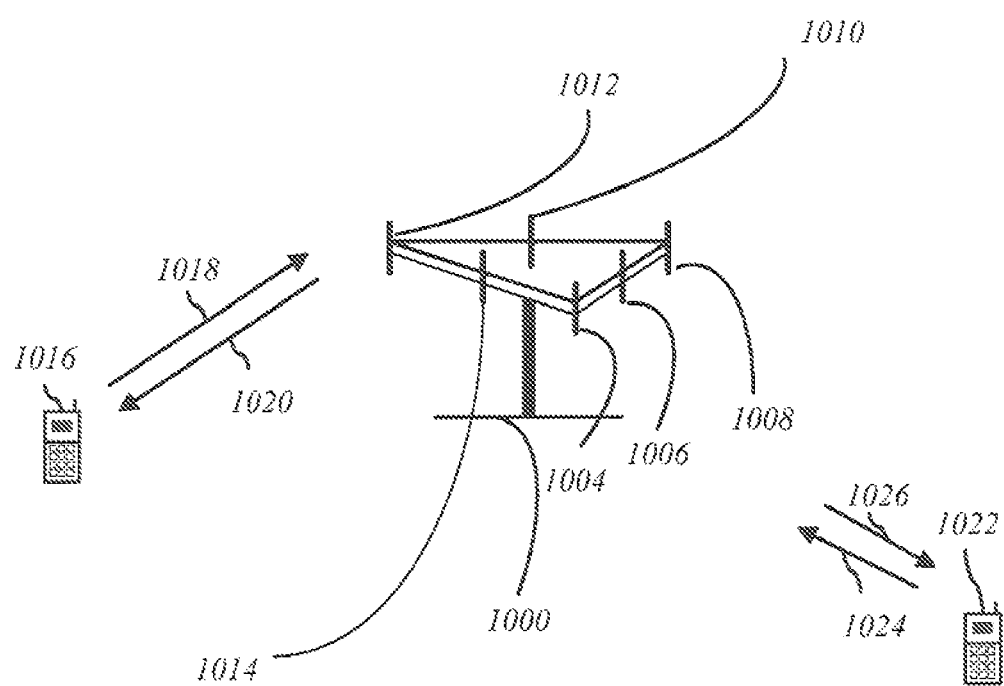
FIGS. 10 and 11 illustrate example communications systems that can be employed with channel estimation components.

Referring now to FIG. 10, a multiple access wireless communication system according to one aspect is illustrated. An access point 1000 (AP) includes multiple antenna groups, one including 1004 and 1006, another including 1008 and. 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
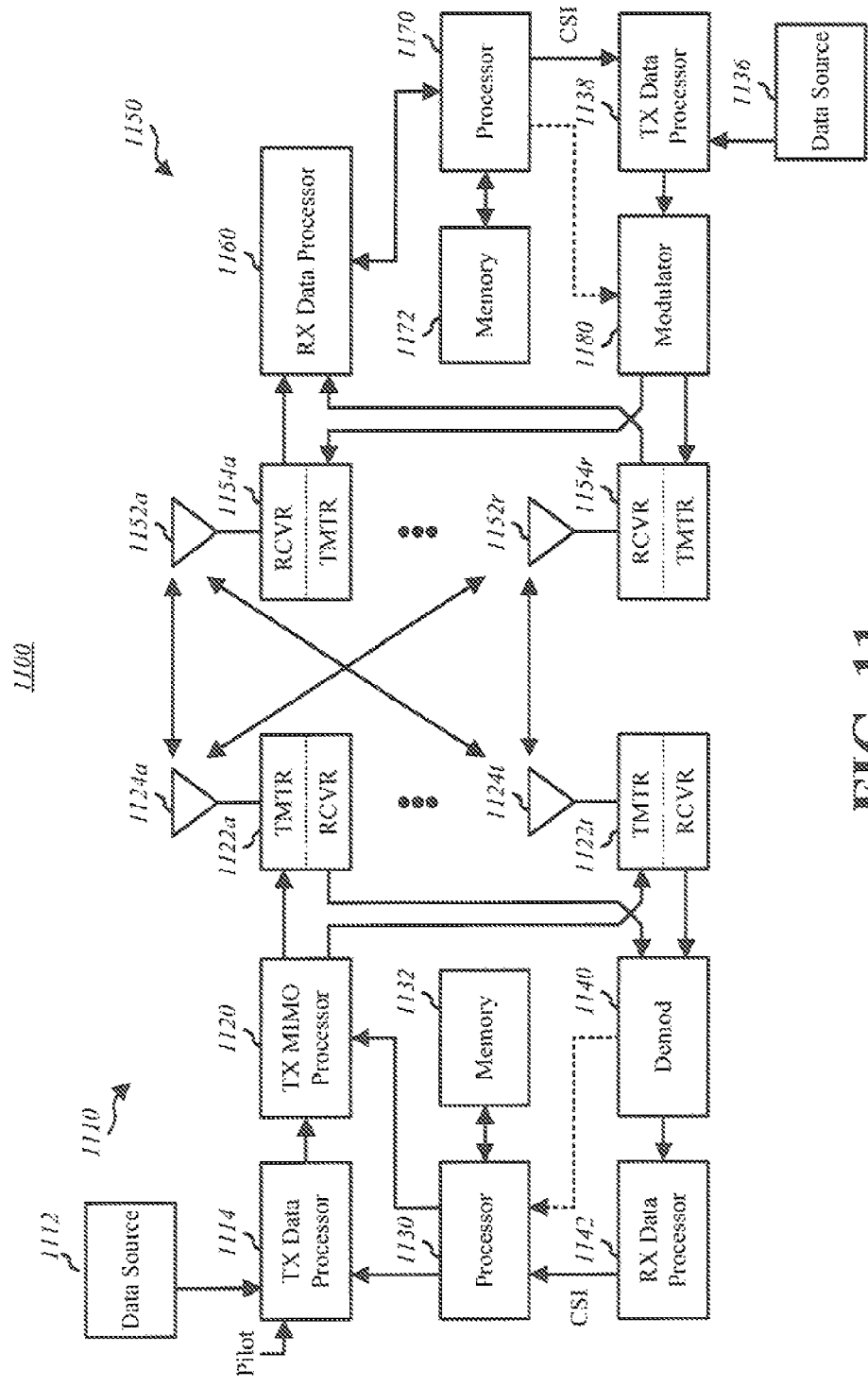

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bidirectional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for a wireless communication system, comprising:
   generating a set of signal sources that are operably associated with a set of time domain windows, in which each signal source is associated with a different time domain window; and
   periodically switching the association between the set of time domain windows and the set of signal sources, in which the signal sources in the set become associated with new time domain windows, by alternating coding sequences while transmitting the set of signal sources from at least one transmitter.

2. The method of claim 1, further comprising analyzing a shift between the time domain windows and the signal sources.

3. The method of claim 2, further comprising determining if a shift has occurred, then assigning an adjacent signal to a present time domain window if the shift has occurred.

4. The method of claim 2, further comprising determining if a shift has occurred, then assigning a received signal to a present time domain window if the shift has not occurred.

5. The method of claim 1, where periodically switching further comprises changing an orthogonal spreading code at a base station or sector.

6. The method of claim 1, where periodically switching further comprises alternating antennas at a base station.

7. The method of claim 1, where periodically switching further comprises alternating antennas across sectors of a base station.

8. The method of claim 1, where periodically switching further comprises alternating orthogonal sequences across multiple base stations.

9. The method of claim 1, further comprising analyzing L pilot tone observations, where L is a positive integer.

10. The method of claim 9, further comprising analyzing a cyclic prefix to facilitate wireless communications.

11. The method of claim 9, in which the pilot tone observations are associated with three or more base stations.

12. The method of claim 9, in which the pilot tone observations are associated with three or more sectors of a single base station.

13. The method of claim 1, in which the periodically switching comprises permuting.

14. The method of claim 13, further comprising performing 3! sequences, where ! is a factorial operation.

15. The method of claim 13, further comprising interchanging orthogonal sequence matrices S1 and S2.

16. The method of claim 15, further comprising changing sequences every k times a 0.5 millisecond boundary, where k is an integer.

17. A communications apparatus, comprising:
    means for generating a set of signal sources that are operably associated with a set of time domain windows, in which each signal source is associated with a different time domain window; and
    means for periodically switching the association between the set of time domain windows and the set of signal sources, in which the signal sources in the set become associated with new time domain windows, by alternating coding sequences while transmitting the set of signal sources from at least one transmitter.

18. The communications apparatus of claim 17, further comprising alternating antenna sources at a base station or sectors of the base station in lieu of alternating the orthogonal sequences.

19. The communications apparatus of claim 17, further comprising means for observing a signal path within a time domain window.

20. The communications apparatus of claim 19, further comprising means for associating the signal path with a present window of observation or an adjacent window.

21. A computer program product for wireless communication systems comprising:

a computer-readable medium having non-transitory program code recorded thereon, the program code comprising:
program code for generating a set of signal sources that are operably associated with a set of time domain windows, in which each signal source is associated with a different time domain window; and
program code for periodically switching an association between a set of time domain windows and a set of signal sources, in which the signal sources in the set become associated with new time domain windows, to facilitate a determination of signal drift by alternating a signal sequence of the set of signal sources while transmitting the set of signal sources from at least one transmitter.

22. The computer-readable medium of claim 21, further comprising generating an alternative antenna sequence.

23. The computer-readable medium of claim 21, further comprising generating an orthogonal sequence.

24. An apparatus for wireless communication comprising:
a memory;
at least one processor coupled to the memory, the at least one processor being configured to execute the following instructions:
storing a set of signal sequences at a base station, the set of signal sequences to be applied to a set of signal sources associated with a set of time domain windows, in which each signal source is associated with a different time domain window;
transmitting at least one of the signal sources of the set of signal sources from the base station; and
periodically switching an association between the set of time domain windows and the set of signal sources, in which the signal sources in the set become associated with new time domain windows, to facilitate a determination of signal drift by alternating at least one of the signal sequences of the set of signal sources while transmitting the at least one of the signal sources of the set of signal sources from at least one transmitter.

25. The apparatus of claim 24, further comprising alternating the at least one of the signal sequences from multiple sectors of the base station.

26. The apparatus of claim 24, further comprising alternating the at least one of the signal sequences across multiple antennas.

* * * * *